(12) United States Patent
Wu et al.

(10) Patent No.: US 11,243,061 B2
(45) Date of Patent: Feb. 8, 2022

(54) WHEEL COMPREHENSIVE DETECTING DEVICE

(71) Applicant: CITIC Dicastal Co., LTD, Qinhuangdao (CN)

(72) Inventors: Guorui Wu, Qinhuangdao (CN); Bowen Xue, Qinhuangdao (CN); Jiandong Guo, Qinhuangdao (CN)

(73) Assignee: CITIC DICASTAL CO., LTD, Qinhuangdao (CN)

(*) Notice: Subject to any disclaimer, the term of this patent is extended or adjusted under 35 U.S.C. 154(b) by 348 days.

(21) Appl. No.: 16/548,915

(22) Filed: Aug. 23, 2019

(65) Prior Publication Data
US 2020/0141712 A1 May 7, 2020

(30) Foreign Application Priority Data
Nov. 6, 2018 (CN) .......................... 201811313326.4

(51) Int. Cl.
*G01B 5/00* (2006.01)
*G01B 5/12* (2006.01)
*G01M 17/013* (2006.01)

(52) U.S. Cl.
CPC ............. *G01B 5/0025* (2013.01); *G01B 5/12* (2013.01); *G01M 17/013* (2013.01)

(58) Field of Classification Search
CPC ................................ G01B 5/0025; G01B 5/12
USPC ........................................................ 33/203.12
See application file for complete search history.

(56) References Cited

U.S. PATENT DOCUMENTS

| | | | | |
|---|---|---|---|---|
| 5,033,003 A | * | 7/1991 | Lees, Sr. ............. | G01M 17/021 |
| | | | | 701/124 |
| 10,124,394 B2 | * | 11/2018 | Xue ..................... | B21D 53/264 |
| 10,234,275 B1 | * | 3/2019 | Liu ...................... | G01B 5/0025 |
| 10,436,568 B2 | * | 10/2019 | Liu ....................... | G01B 5/207 |
| 10,641,621 B1 | * | 5/2020 | Liu ...................... | B21D 43/003 |
| 11,047,668 B2 | * | 6/2021 | Xu ...................... | G01M 17/013 |
| 2021/0088414 A1 | * | 3/2021 | Liu ..................... | G01M 17/013 |

* cited by examiner

*Primary Examiner* — Christopher W Fulton

(57) ABSTRACT

A wheel comprehensive detecting device, comprises a lower lifting and rotating system, a measuring system I, a measuring system II, a upper pressing system, a translation system, a measuring system III, a measuring system IV. The present disclosure in use is capable of measuring the wheel bolt hole position, the runout of the flange plane, the runouts of the upper and lower rim end faces, the runouts of the upper and lower bead seats, the height of counterbore end face of the bolt hole, the height and offset of the riser end face, etc.

1 Claim, 4 Drawing Sheets

WHEEL COMPREHENSIVE DETECTING DEVICE

CROSS-REFERENCE TO RELATED APPLICATIONS

The present application claims the priority of Chinese patent application No. 201811313326.4, filed on Nov. 6, 2018, which is hereby incorporated by reference in its entirety.

TECHNICAL FIELD

The present disclosure relates to a detecting device, and more particularly to a wheel comprehensive detecting device.

BACKGROUND

In the processing industry of aluminum alloy wheels, with the process of on-line mass production, the parameters of the wheels need to be monitored in time during the production process to ensure that the size of the produced wheel is fully qualified; for the wheel bolt hole position, the runout of the flange plane, the runouts of the upper and lower rim end faces, the runouts of the upper and lower bead seats, the height of counterbore end face of the bolt hole, the height and offset of the riser end face, etc., the traditional measurement method is manual measurement, which not only has large measurement error, but also has low measurement efficiency, and cannot meet the needs of mass production at all. Therefore, there is a need for an automated measuring device that performs fast and automatic measurements of these parameters.

SUMMARY

The object of the present disclosure is to provide a comprehensive wheel detecting device capable of measuring the wheel bolt hole position, the runout of the flange plane, the runouts of the upper and lower rim end faces, the runouts of the upper and lower bead seats, the height of counterbore end face of the bolt hole, the height and offset of the riser end face, etc.

In order to achieve the above object, the technical solution of the present disclosure is as follows: The device comprises a frame, lower guiding posts I, a lower servo motor I, lower guiding sleeves I, a lower fixing plate I, a lower lifting plate, a pulley I, a synchronous belt, a pulley II, a central shaft, a central bearing pedestal, a spring I, an end positioning shaft, a dial indicator I, a jackscrew, a fixing block, a sliding post, a lower cone shaft, an upper cone shaft, a cross hinge, an upper shaft I, an upper bearing pedestal I, an upper lifting plate, upper guiding posts, upper guiding sleeves, upper cylinders, a vertical plate, a lower servo motor II, a lower sliding plate I, a lower gear I, a lower rack I, a lower guiding rail I, lower servo electric cylinders I, a lower fixing plate II, lower guiding sleeves II, lower guiding posts II, a guiding key, a lifting sleeve, a lower gear II, a lower ring gear, a ring guiding rail, a lower plate I, a lower plate II, a lower guiding rail II, a lower plate III, a sensor I, a lower sliding plate II, a spring II, a lower guiding rail III, a lower plate IV, a lower top plate, a measuring sleeve, a measuring post, a lower rack III, a lower gear III, a lower servo motor III, a lower plate V, a lower servo electric cylinder II, a lower plate VI, a lower servo motor IV, lower servo electric cylinders III, a lower servo motor V, a lower sliding plate III, a lower guiding rail IV, a lower gear IV, a lower rack IV, a lower servo motor VI, a lower transversal plate I, a lower gear V, a lower rack V, a lower guiding rail V, a lower transversal plate II, a lower servo motor VII, a lower plate VII, a lower bearing pedestal I, a lower shaft I, a lower overturning frame, a lower servo motor VIII, a lower overturning plate, a dial indicator II, a sensor II, an upper servo motor I, an upper sliding plate, an upper guiding rail I, an upper gear I, an upper rack I, an upper gear II, an upper rack II, an upper transversal plate I, an upper servo motor II, an upper guiding rail II, an upper transversal plate II, an upper servo motor III, an upper shaft II, an upper bearing pedestal II, an upper overturning frame, an upper servo motor IV, an upper overturning plate, a dial indicator III and a sensor III.

The lower lifting and rotating system comprises: the four lower guiding sleeves I are fixed on the lower fixing plate I; the four lower guiding posts I matching with the four lower guiding sleeves I are fixed below the lower lifting plate; the two lower servo electric cylinders I are fixed below the fixing plate I, and the output end thereof is hinged to the lower part of the lower lifting plate; the lower servo motor I is fixed below the lower fixing plate I through a transition flange, and the output end thereof is fixed with the pulley I; the central bearing pedestal is fixed above the lower lifting plate; the central shaft is mounted inside the central bearing pedestal through a bearing; the pulley II is fixed below the central shaft; and the pulley I and the pulley II are connected by the synchronous belt.

The measuring system I comprises: the end positioning shaft is mounted in a hole at the upper end of the central shaft through a bearing; the outer circumference of the sliding post is slidably matched with the inner hole of the end positioning shaft; the jackscrew is mounted on the end positioning shaft, and the top end thereof is engaged with the opening groove on the sliding post; the lower cone shaft is fixed on the top end of the sliding post; the spring I is mounted in the inner hole of the end positioning shaft and is placed on the lower end of the sliding post; the fixing block is fixed on left side above the central shaft; and the dial indicator I is fixed on the fixing block, and the probe thereof is mounted upward.

The measuring system II comprises: the lower fixing plate II is fixed on the outer side of the central shaft; the four lower guiding sleeves II fixed on the lower fixing plate II; the four lower guiding posts II matching with the four lower guiding sleeves II are fixed below the lifting sleeve; the two lower servo electric cylinders III are fixed below the lower fixing plate II, and the output end thereof is hinged to the lower part of the lifting sleeve; the guiding key of the lifting sleeve is mounted on the outer side of the top end of the central shaft; the lower ring gear is fixed on the outside above the lifting sleeve; the ring guiding rail is also fixed on the outer side above the lifting sleeve, and is placed above the lower ring gear; the lower plate I is fixed on the slider of the ring guiding rail; the lower plate II is fixed above the lower plate I; the lower plate VI is fixed on the lower end of the right side of the lower plate I; the lower plate V is fixed on the upper end of right side of the lower plate VI; the lower servo motor IV is fixed above the lower plate VI, and the output end thereof is fixed with the lower gear II; the lower gear II is meshed with the lower ring gear; the lower plate III is mounted above the lower plate II through the lower guiding rail II; the lower servo electric cylinder II is fixed on the lower plate V, and the output end thereof is connected to the lower part of the lower plate III; the lower top plate is fixed above the lower plate III through the lower plate IV; the lower sliding plate II is mounted below the lower top plate through the lower guiding rail III; the measuring sleeve is fixed above the lower sliding plate II; the measuring post is matched with the measuring sleeve, and the top end thereof protrudes from the upper end surface of the lower top plate; the spring II is mounted inside the measuring sleeve, and is placed below the measuring post; the sensor I is fixed on the lower sliding plate II, and the top end thereof is in contact with the lower end surface of the measuring post; the lower servo motor III is fixed below the lower top plate through a lower flange, and the output end thereof is fixed with the lower gear III; the lower rack III is fixed on the right side of the lower sliding plate II; and the lower gear III is meshed with the lower rack III, the number of the sets of the measuring system II of the device corresponds to the number of wheel bolt holes.

The upper pressing system comprises: the four upper guiding sleeves are fixed on the top end of the frame; the four upper guiding posts matching with the four upper guiding sleeves are fixed above the upper lifting plate; the two upper cylinders are also fixed on the top end of the frame, and the output end thereof is hinged to the upper part of the upper lifting plate; the upper bearing pedestal I is fixed below the upper lifting plate; the upper shaft I is mounted inside the upper bearing pedestal I through a bearing; and the lower end of the upper shaft I is fixed with the upper cone shaft through the cross hinge.

The translation system comprises: the lower sliding plate I is mounted on the right side above the lower lifting plate through the lower guiding rail I; the lower rack I is fixed above the lower lifting plate; the lower servo motor II is fixed above the lower sliding plate I, and the output end thereof is fixed with the lower gear I; the lower gear I is meshed with the lower rack I; and the vertical plate is fixed above the lower sliding plate I.

The measuring system III comprises: the lower sliding plate III is mounted on the left side of the vertical plate through the lower guiding rail IV; the lower rack IV is fixed on the left side of the vertical plate; the lower servo motor V is fixed on the left side of the lower sliding plate III, and the output end thereof is fixed with the lower gear IV; the lower gear IV is meshed with the lower rack IV; the lower transversal plate I is fixed above the lower sliding plate III; the lower servo motor VI is fixed below the lower transversal plate I, and the output end thereof is fixed with the lower rack V; the lower transversal plate II is mounted above the lower transversal plate I through the lower guiding rail V; the lower rack V is fixed on the right side of the lower transversal plate II; the lower rack V is meshed with the lower gear V; the lower plate VII is fixed on the left side above the lower transversal plate II; the lower bearing pedestal I is fixed on the left side of the lower plate VII; the lower shaft I is mounted inside the lower bearing pedestal I through a bearing; the lower servo motor VII is fixed on the right side of the lower plate VII, and the output end thereof is connected with the right side of the lower shaft I; the lower overturning frame is fixed on the left side of the lower shaft I; the lower servo motor VIII is fixed above the lower overturning frame; the right side of the lower overturning plate is connected with the output end of the lower servo motor VIII; the dial indicator II is fixed on the left side of the lower overturning plate, and the probe thereof is mounted upward; and the sensor II is fixed below the lower overturning frame, and the probe thereof is mounted downward.

The measuring system IV comprises: the upper sliding plate is mounted on the left side of the vertical plate through the upper guiding rail I; the upper rack I is fixed to the left side of the vertical plate; the upper servo motor I is fixed to the left side of the upper sliding plate, and the output end thereof The upper gear I is fixed; the upper gear I is meshed with the upper rack I; the upper transversal plate I is fixed at the lower end of the upper sliding plate; the upper servo motor II is fixed on the lower end of the upper transversal plate I, and the output end thereof is fixed with the upper gear II; the transversal plate II is mounted above the upper transversal plate I through the upper guiding rail II; the upper rack II is fixed on the right side of the upper transversal plate II; the upper rack II is meshed with the upper gear II; the upper bearing pedestal II is fixed on the left side of the upper end of the upper transversal plate II; the upper shaft II is mounted inside the upper bearing pedestal II through a bearing; the upper servo motor III is fixed on the right side of the upper end of the upper transversal plate II, and the output end thereof is connected with the right end of the upper shaft II; the upper overturning frame is fixed on the left side of the upper shaft II; the upper servo motor IV is fixed below the upper overturning frame; the output end of the upper servo motor IV is connected with the right side of the upper overturning plate; the dial indicator III is fixed on the left side of the upper overturning plate, and the probe thereof is mounted downward; and the sensor III is fixed above the upper overturning frame, and the probe thereof is mounted upward.

During the operation, the lower servo electric cylinder III adjusts the lower top plate and the measuring post to the appropriate height through the lower guiding posts II, the lower guiding sleeves II and the guide key; the lower servo electric cylinder II moves the top plate and the measuring post to the left through the lower guiding rail II; the lower servo motor III adjusts the horizontal position of each measuring post to correspond to the theoretical pitch circle position of the wheel bolt hole through the lower gear III, the lower rack III and the lower guiding rail III; the lower servo motor IV adjusts the angle between each measuring posts to correspond to the theoretical angle of each bolt hole of the wheel through the lower gear II, the lower ring gear and the ring guiding rail; the lower servo motor I rotate the central shaft and each measuring posts through the pulley I, the pulley II and the synchronous belt, and stop rotating when the position of the respective measuring posts correspond to the positions of the respective bolt holes of the wheel; the lower servo electric cylinder I lifts the lower cone shaft, the lower top plate and each measuring post through the lower guiding posts I and the lower guiding sleeves I; the lower cone shaft first is matched with the wheel center hole, and the wheel is radially positioned by the center hole; then the lower top plate is lifted, the spring I is compressed, and the end surface of the lower top plate is level with the wheel flange surface, at which time the wheel is completely positioned; the upper cylinder moves the upper cone shaft downward through the upper guiding posts and the upper guiding sleeves, to press the wheel riser; if the respective measuring posts can be fully inserted into the respective bolt hole of the wheel, the wheel bolt hole position degree is qualified; and if a certain measuring post cannot be inserted into the corresponding wheel bolt hole, the measuring post is pressed down, and the sensor I will generate a signal indicating that the wheel bolt hole in the corresponding position is unqualified.

The lower servo motor II moves the vertical plate left to the appropriate position through the lower gear I, the lower rack I and the lower guiding rail I; the lower servo motor V can adjust the upper and lower positions of the dial indicator II through the lower gear IV, the lower rack IV and the lower guiding rail IV; the lower servo motor VI can adjust the horizontal position of the dial indicator II through the lower gear V, the lower rack V and the lower guiding rail V; when the dial indicator II contacts the end face of the wheel lower rim, the lower servo motor I, through the pulley I, the pulley II and the synchronous belt, causes each measuring post to drive the wheel to rotate; at this time, the runout of the end face of the lower rim can be measured; when the dial indicator II contacts the lower bead seat of the wheel, the runout of the lower bead seat can be measured; and the lower servo motor VII rotates the lower overturning frame by 90 degrees through the lower shaft I, and when the sensor II contacts the end face of the wheel lower rim, the positional dimension here can be measured.

The upper servo motor I can adjust the upper and lower positions of the dial indicator III through the upper gear I, the upper rack I and the upper guiding rail I; the upper servo motor II can adjust the horizontal position of dial indicator III through the upper gear II, the upper rack II and the upper guiding rail II; when the dial indicator III contacts the end face of the upper wheel rim, the lower servo motor I, through the pulley I, the pulley II and the synchronous belt, causes each measuring post to drive the wheel to rotate; at this time, the runout of the end face of upper wheel rim can be measured; when the dial indicator III contacts the wheel bead seat, the upper bead seat can be measured; the upper servo motor III rotates the upper overturning frame by 90 degrees through the upper shaft II, and when the sensor III contacts the end face of the upper wheel rim, the position dimension here can be measured; when the sensor III contacts the counterbore end face of each bolt hole of the wheel, the height of the counterbore end face of the bolt hole can be measured; and when the sensor III contacts the end face of the wheel riser, the height of the end face of the wheel riser can be measured.

According to the position dimension of the end face of the lower top plate when measuring the position degree of the wheel bolt hole, combining with the position dimension the end face of the lower wheel rim measured by the sensor II, and the position dimension of the end face the upper wheel rim measured by the sensor III, the offset size of the wheel can be calculated.

After completing the measuring of the position degree, the lower servo electric cylinder I lowers the lower top plate to be separated from the wheel flange surface through the lower guiding posts I and the lower guiding sleeves I; the lower servo electric cylinder II moves the lower top plate to the right through the lower guiding rail II; the lower servo electric cylinder III is moved downward through the lower guiding posts II, the lower guiding sleeves II and the guiding key, so that the upper end face of the lower top plate is placed below the upper end face of the end positioning shaft; the lower servo electric cylinder I lifts the end positioning shaft through the lower guiding posts I and the lower guiding sleeves I, so that the upper end face thereof is level with the wheel flange surface; meanwhile, the probe of the dial indicator I is in contact with the wheel flange surface; and the lower servo motor I rotates the central shaft and the dial indicator I through the pulley I, the pulley II and the synchronous belt, and the runout of the wheel flange surface can be measured at this time.

The present disclosure in use is capable of measuring the wheel bolt hole position, the runout of the flange plane, the runouts of the upper and lower rim end faces, the runouts of the upper and lower bead seats, the height of counterbore end face of the bolt hole, the height and offset of the riser end face, etc.

DETAILED DESCRIPTION

Figure 1:
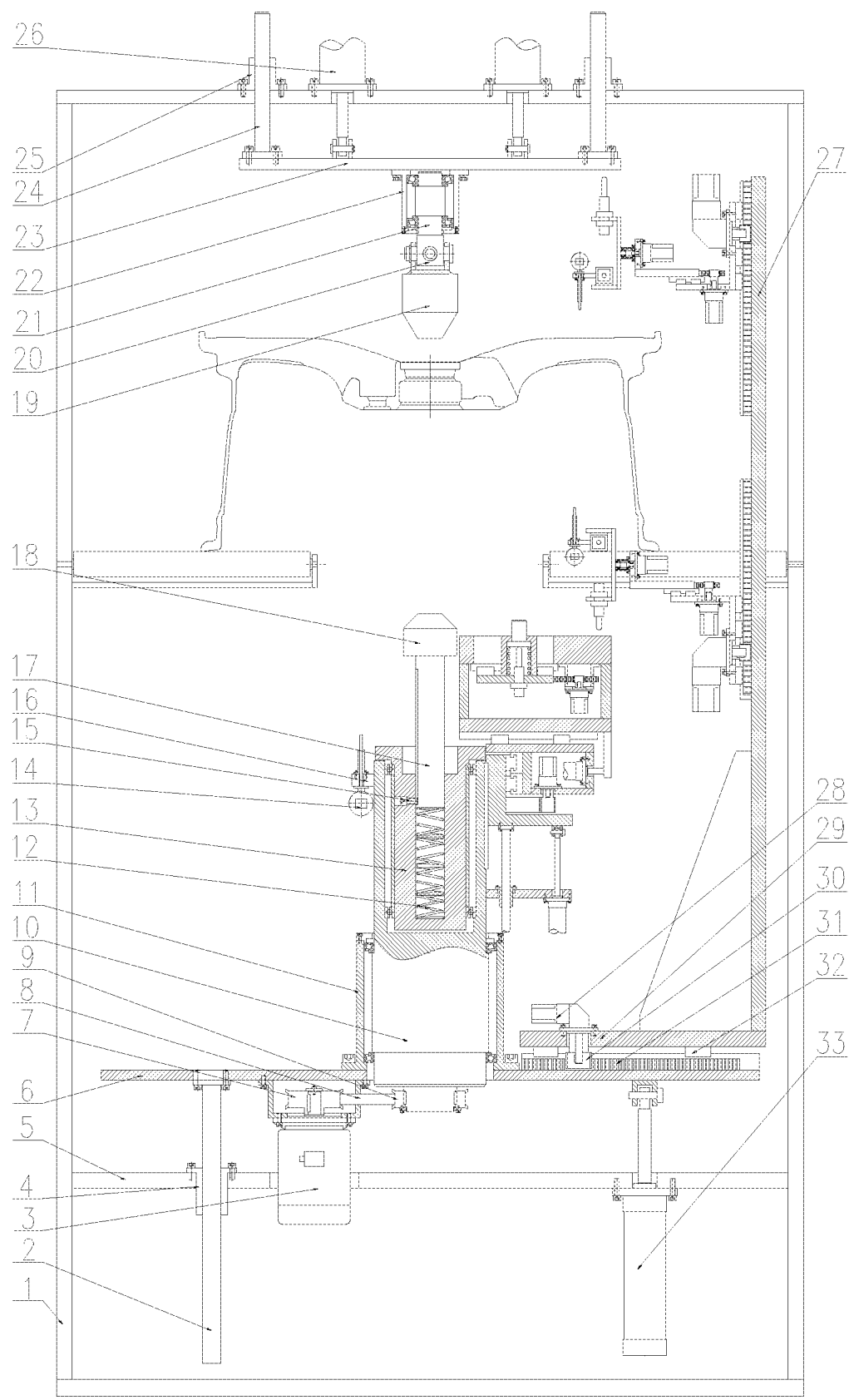
FIG. 1 is the main view of the wheel comprehensive detecting device of the present disclosure.
Figure 2:
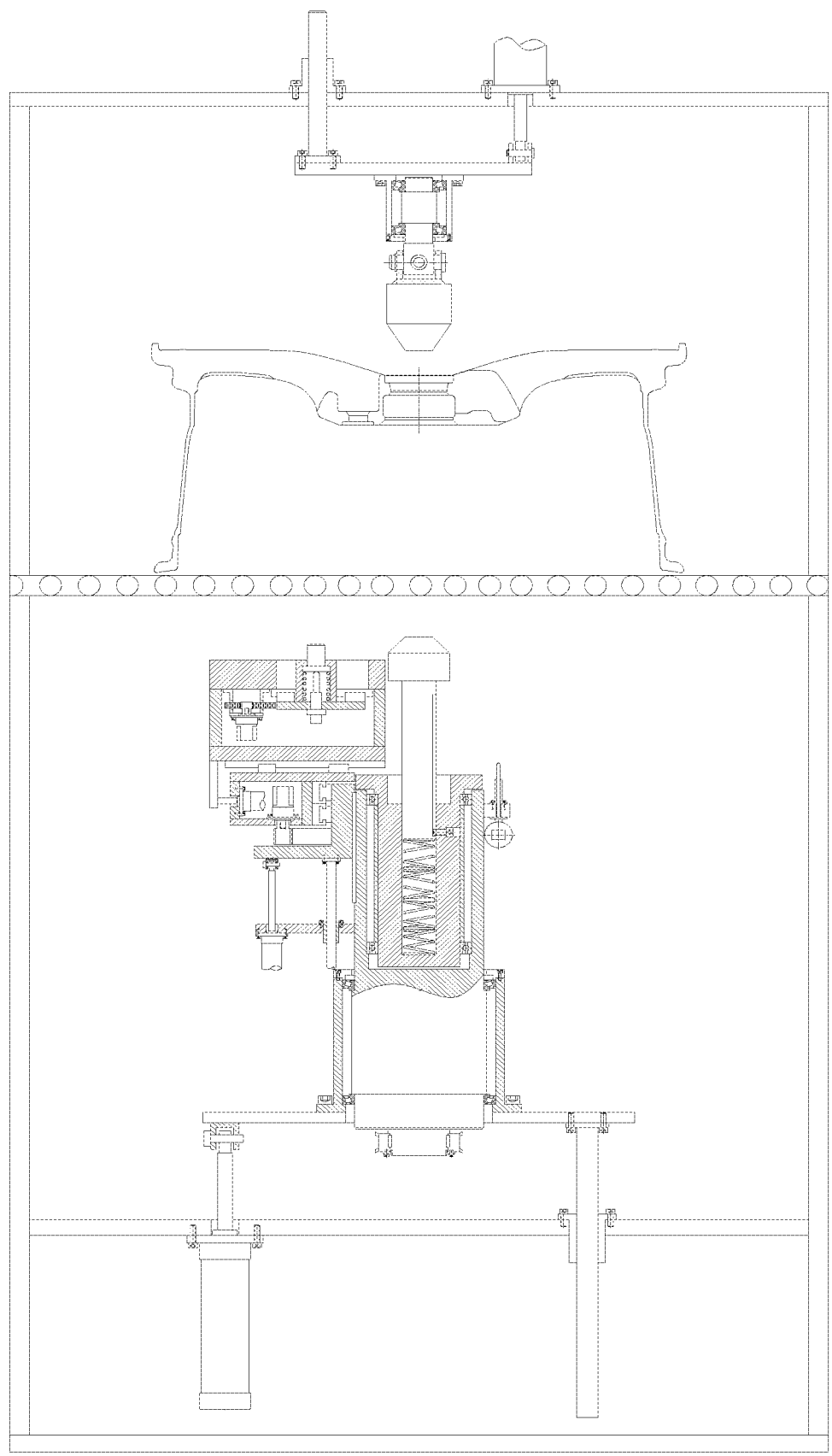
FIG. 2 is the left view of wheel comprehensive detecting device.
Figure 3:
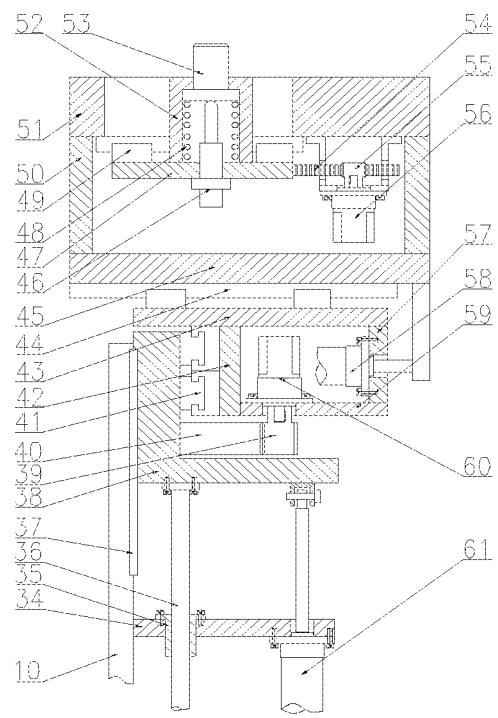
FIG. 3 is the main view of measuring system II of wheel comprehensive detecting device.
Figure 4:
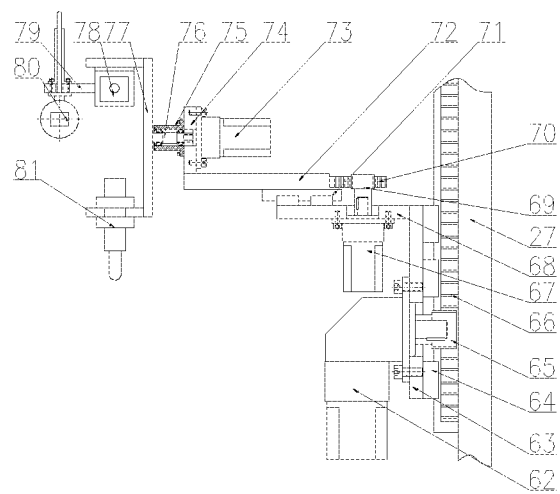
FIG. 4 is the main view of measuring system III of wheel comprehensive detecting device.
Figure 5:
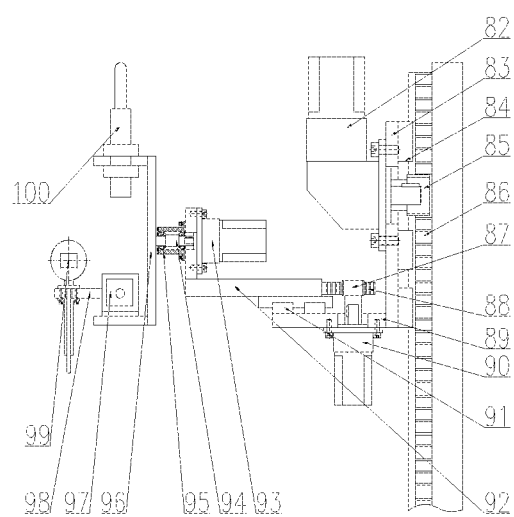
FIG. 5 is the main view of measuring system IV of wheel comprehensive detecting device.

The details and operation of the specific device according to the present disclosure will be described below with reference to the accompanying drawings.

The device comprises a frame 1, lower guiding posts I 2, a lower servo motor I 3, lower guiding sleeves I 4, a lower fixing plate I 5, a lower lifting plate 6, a pulley I 7, a synchronous belt 8, a pulley II 9, a central shaft 10, a central bearing pedestal 11, a spring I 12, an end positioning shaft 13, a dial indicator I 14, a jackscrew 15, a fixing block 16, a sliding post 17, a lower cone shaft 18, an upper cone shaft 19, a cross hinge 20, an upper shaft I 21, an upper bearing pedestal I 22, an upper lifting plate 23, upper guiding posts 24, upper guiding sleeves 25, upper cylinders 26, a vertical plate 27, a lower servo motor II 28, a lower sliding plate I 29, a lower gear I 30, a lower rack I 31, a lower guiding rail I 32, lower servo electric cylinders I 33, a lower fixing plate II 34, lower guiding sleeves II 35, lower guiding posts II 36, a guiding key 37, a lifting sleeve 38, a lower gear II 39, a lower ring gear 40, a ring guiding rail 41, a lower plate I 42, a lower plate II 43, a lower guiding rail II 44, a lower plate III 45, a sensor I 46, a lower sliding plate II 47, a spring II 48, a lower guiding rail III 49, a lower plate IV 50, a lower top plate 51, a measuring sleeve 52, a measuring post 53, a lower rack III 54, a lower gear III 55, a lower servo motor III 56, a lower plate V 57, a lower servo electric cylinder II 58, a lower plate VI 59, a lower servo motor IV 60, lower servo electric cylinders III 61, a lower servo motor V 62, a lower sliding plate III 63, a lower guiding rail IV 64, a lower gear IV 65, a lower rack IV 66, a lower servo motor VI 67, a lower transversal plate I 68, a lower gear V 69, a lower rack V 70, a lower guiding rail V 71, a lower transversal plate II 72, a lower servo motor VII 73, a lower plate VII 74, a lower bearing pedestal I 75, a lower shaft I 76, a lower overturning frame 77, a lower servo motor VIII 78, a lower overturning plate 79, a dial indicator II 80, a sensor II 81, an upper servo motor I 82, an upper sliding plate 83, an upper guiding rail I 84, an upper gear I 85, an upper rack I 86, an upper gear II 87, an upper rack II 88, an upper transversal plate I 89, an upper servo motor II 90, an upper guiding rail II 91, an upper transversal plate II 92, an upper servo motor III 93, an upper shaft II 94, an upper bearing pedestal II 95, an upper overturning frame 96, an upper servo motor IV 97, an upper overturning plate 98, a dial indicator III 99 and a sensor III 100.

The lower lifting and rotating system comprises: the four lower guiding sleeves I 4 are fixed on the lower fixing plate I 5; the four lower guiding posts I 2 matching with the four lower guiding sleeves I 4 are fixed below the lower lifting plate 6; the two lower servo electric cylinders I 33 are fixed below the fixing plate I 5, and the output end thereof is hinged to the lower part of the lower lifting plate 6; the lower servo motor I 3 is fixed below the lower fixing plate I 5 through a transition flange, and the output end thereof is fixed with the pulley I 7; the central bearing pedestal 11 is fixed above the lower lifting plate 6; the central shaft 10 is mounted inside the central bearing pedestal 11 through a bearing; the pulley II 9 is fixed below the central shaft 10; and the pulley I 7 and the pulley II 9 are connected by the synchronous belt 8.

The measuring system I comprises: the end positioning shaft 13 is mounted in a hole at the upper end of the central shaft 10 through a bearing; the outer circumference of the sliding post 17 is slidably matched with the inner hole of the end positioning shaft 13; the jackscrew 15 is mounted on the end positioning shaft 13, and the top end thereof is engaged with the opening groove on the sliding post 17; the lower cone shaft 18 is fixed on the top end of the sliding post 17; the spring I 12 is mounted in the inner hole of the end positioning shaft 13 and is placed on the lower end of the sliding post 17; the fixing block 16 is fixed on left side above the central shaft 10; and the dial indicator I 14 is fixed on the fixing block 16, and the probe thereof is mounted upward.

The measuring system II comprises: the lower fixing plate II 34 is fixed on the outer side of the central shaft 10; the four lower guiding sleeves II 35 fixed on the lower fixing plate II 34; the four lower guiding posts II 36 matching with the four lower guiding sleeves II 35 are fixed below the lifting sleeve 38; the two lower servo electric cylinders III 61 are fixed below the lower fixing plate II 34, and the output end thereof is hinged to the lower part of the lifting sleeve 38; the guiding key 37 of the lifting sleeve 38 is mounted on the outer side of the top end of the central shaft 10; the lower ring gear 40 is fixed on the outside above the lifting sleeve 38; the ring guiding rail 41 is also fixed on the outer side above the lifting sleeve 38, and is placed above the lower ring gear 40; the lower plate I 42 is fixed on the slider of the ring guiding rail 41; the lower plate II 43 is fixed above the lower plate I 42; the lower plate VI 59 is fixed on the lower end of the right side of the lower plate I 42; the lower plate V 57 is fixed on the upper end of right side of the lower plate VI 59; the lower servo motor IV 60 is fixed above the lower plate VI 59, and the output end thereof is fixed with the lower gear II 39; the lower gear II 39 is meshed with the lower ring gear 40; the lower plate III 45 is mounted above the lower plate II 43 through the lower guiding rail II 44; the lower servo electric cylinder II 58 is fixed on the lower plate V 57, and the output end thereof is connected to the lower part of the lower plate III 45; the lower top plate 51 is fixed above the lower plate III 45 through the lower plate IV 50; the lower sliding plate II 47 is mounted below the lower top plate 51 through the lower guiding rail III 49; the measuring sleeve 52 is fixed above the lower sliding plate II 47; the measuring post 53 is matched with the measuring sleeve 52, and the top end thereof protrudes from the upper end surface of the lower top plate 51; the spring II 48 is mounted inside the measuring sleeve 52, and is placed below the measuring post 53; the sensor I 46 is fixed on the lower sliding plate II 47, and the top end thereof is in contact with the lower end surface of the measuring post 53; the lower servo motor III 56 is fixed below the lower top plate 51 through a lower flange, and the output end thereof is fixed with the lower gear III 55; the lower rack III 54 is fixed on the right side of the lower sliding plate II 47; and the lower gear III 55 is meshed with the lower rack III 54. The number of the sets of the measuring system II of the device corresponds to the number of wheel bolt holes.

The upper pressing system comprises: the four upper guiding sleeves 25 are fixed on the top end of the frame 1; the four upper guiding posts 24 matching with the four upper guiding sleeves 25 are fixed above the upper lifting plate 23; the two upper cylinders 26 are also fixed on the top end of the frame 1, and the output end thereof is hinged to the upper part of the upper lifting plate 23; the upper bearing pedestal I 22 is fixed below the upper lifting plate 23; the upper shaft I 21 is mounted inside the upper bearing pedestal I 22 through a bearing; and the lower end of the upper shaft I 21 is fixed with the upper cone shaft 19 through the cross hinge 20.

The translation system comprises: the lower sliding plate I 29 is mounted on the right side above the lower lifting plate 6 through the lower guiding rail I 32; the lower rack I 31 is fixed above the lower lifting plate 6; the lower servo motor II 28 is fixed above the lower sliding plate I 29, and the output end thereof is fixed with the lower gear I 30; the lower gear I 30 I is meshed with the lower rack I 31; and the vertical plate 27 is fixed above the lower sliding plate I 29.

The measuring system III comprises: the lower sliding plate III 63 is mounted on the left side of the vertical plate 27 through the lower guiding rail IV 64; the lower rack IV 66 is fixed on the left side of the vertical plate 27; the lower servo motor V 62 is fixed on the left side of the lower sliding plate III 63, and the output end thereof is fixed with the lower gear IV 65; the lower gear IV 65 is meshed with the lower rack IV 66; the lower transversal plate I 68 is fixed above the lower sliding plate III 63; the lower servo motor VI 67 is fixed below the lower transversal plate I 68, and the output end thereof is fixed with the lower rack V 70; the lower transversal plate II 72 is mounted above the lower transversal plate I 68 through the lower guiding rail V 71; the lower rack V 70 is fixed on the right side of the lower transversal plate II 72; the lower rack V 70 is meshed with the lower gear V 69; the lower plate VII 74 is fixed on the left side above the lower transversal plate II 72; the lower bearing pedestal I 75 is fixed on the left side of the lower plate VII 74; the lower shaft I 76 is mounted inside the lower bearing pedestal I 75 through a bearing; the lower servo motor VII 73 is fixed on the right side of the lower plate VII 74, and the output end thereof is connected with the right side of the lower shaft I 76; the lower overturning frame 77 is fixed on the left side of the lower shaft I 76; the lower servo motor VIII 78 is fixed above the lower overturning frame 77; the right side of the lower overturning plate 79 is connected with the output end of the lower servo motor VIII 78; the dial indicator II 80 is fixed on the left side of the lower overturning plate 79, and the probe thereof is mounted upward; and the sensor II 81 is fixed below the lower overturning frame 77, and the probe thereof is mounted downward.

The measuring system IV comprises: the upper sliding plate 83 is mounted on the left side of the vertical plate 27 through the upper guiding rail I 84; the upper rack I 86 is fixed to the left side of the vertical plate 27; the upper servo motor I 82 is fixed to the left side of the upper sliding plate 83, and the output end thereof The upper gear I 85 is fixed; the upper gear I 85 is meshed with the upper rack I 86; the upper transversal plate I 89 is fixed at the lower end of the upper sliding plate 83; the upper servo motor II 90 is fixed on the lower end of the upper transversal plate I 89, and the output end thereof is fixed with the upper gear II 87; the transversal plate II 92 is mounted above the upper transversal plate I 89 through the upper guiding rail II 91; the upper rack II 88 is fixed on the right side of the upper transversal plate II 92; the upper rack II 88 is meshed with the upper gear II 87; the upper bearing pedestal II 95 is fixed on the left side of the upper end of the upper transversal plate II 92; the upper shaft II 94 is mounted inside the upper bearing pedestal II 95 through a bearing; the upper servo motor III 93 is fixed on the right side of the upper end of the upper transversal plate II 92, and the output end thereof is connected with the right end of the upper shaft II 94; the upper overturning frame 96 is fixed on the left side of the upper shaft II 94; the upper servo motor IV 97 is fixed below the upper overturning frame 96; the output end of the upper servo motor IV 97 is connected with the right side of the upper overturning plate 98; the dial indicator III 99 is fixed on the left side of the upper overturning plate 98, and the probe thereof is mounted downward; and the sensor III 100 is fixed above the upper overturning frame 96, and the probe thereof is mounted upward.

During the operation, the lower servo electric cylinder III 61 adjusts the lower top plate 51 and the measuring post 53 to the appropriate height through the lower guiding posts II 36, the lower guiding sleeves II 35 and the guide key 37; the lower servo electric cylinder II 58 moves the top plate 51 and the measuring post 53 to the left through the lower guiding rail II 44; the lower servo motor III 56 adjusts the horizontal position of each measuring post 53 to correspond to the theoretical pitch circle position of the wheel bolt hole through the lower gear III 55, the lower rack III 54 and the lower guiding rail III 49; the lower servo motor IV 60 adjusts the angle between each measuring posts 53 to correspond to the theoretical angle of each bolt hole of the wheel through the lower gear II 39, the lower ring gear 40 and the ring guiding rail 41; the lower servo motor I 3 rotate the central shaft 10 and each measuring posts 53 through the pulley I 7, the pulley II 9 and the synchronous belt 8, and stop rotating when the position of the respective measuring posts 53 correspond to the positions of the respective bolt holes of the wheel; the lower servo electric cylinder I 33 lifts the lower cone shaft 18, the lower top plate 51 and each measuring post 53 through the lower guiding posts I 2 and the lower guiding sleeves I 4; the lower cone shaft 18 first is matched with the wheel center hole, and the wheel is radially positioned by the center hole; then the lower top plate 51 is lifted, the spring I 12 is compressed, and the end surface of the lower top plate 51 is level with the wheel flange surface, at which time the wheel is completely positioned; the upper cylinder 26 moves the upper cone shaft 19 downward through the upper guiding posts 24 and the upper guiding sleeves 25, to press the wheel riser; if the respective measuring posts 53 can be fully inserted into the respective bolt hole of the wheel, the wheel bolt hole position degree is qualified; and if a certain measuring post 53 cannot be inserted into the corresponding wheel bolt hole, the measuring post 53 is pressed down, and the sensor I 46 will generate a signal indicating that the wheel bolt hole in the corresponding position is unqualified.

The lower servo motor II 28 moves the vertical plate 27 left to the appropriate position through the lower gear I 30, the lower rack I 31 and the lower guiding rail I 32; the lower servo motor V 62 can adjust the upper and lower positions of the dial indicator II 80 through the lower gear IV 65, the lower rack IV 66 and the lower guiding rail IV 64; the lower servo motor VI 67 can adjust the horizontal position of the dial indicator II 80 through the lower gear V 69, the lower rack V 70 and the lower guiding rail V 71; when the dial indicator II 80 contacts the end face of the wheel lower rim, the lower servo motor I 3, through the pulley I 7, the pulley II 9 and the synchronous belt 8, causes each measuring post 53 to drive the wheel to rotate; at this time, the runout of the end face of the lower rim can be measured; when the dial indicator II 80 contacts the lower bead seat of the wheel, the runout of the lower bead seat can be measured; and the lower servo motor VII 73 rotates the lower overturning frame 77 by 90 degrees through the lower shaft I 76, and when the sensor II 81 contacts the end face of the wheel lower rim, the positional dimension here can be measured.

The upper servo motor I 82 can adjust the upper and lower positions of the dial indicator III 99 through the upper gear I 85, the upper rack I 86 and the upper guiding rail I 84; the upper servo motor II 90 can adjust the horizontal position of dial indicator III 99 through the upper gear II 87, the upper rack II 88 and the upper guiding rail II 91; when the dial indicator III 99 contacts the end face of the upper wheel rim, the lower servo motor I 3, through the pulley I 7, the pulley II 9 and the synchronous belt 8, causes each measuring post 53 to drive the wheel to rotate; at this time, the runout of the end face of upper wheel rim can be measured; when the dial indicator III 99 contacts the wheel bead seat, the upper bead seat can be measured; the upper servo motor III 93 rotates the upper overturning frame 96 by 90 degrees through the upper shaft II 94, and when the sensor III 100 contacts the end face of the upper wheel rim, the position dimension here can be measured; when the sensor III 100 contacts the counterbore end face of each bolt hole of the wheel, the height of the counterbore end face of the bolt hole can be measured; and when the sensor III 100 contacts the end face of the wheel riser, the height of the end face of the wheel riser can be measured.

According to the position dimension of the end face of the lower top plate 51 when measuring the position degree of the wheel bolt hole, combining with the position dimension the end face of the lower wheel rim measured by the sensor II 81, and the position dimension of the end face the upper wheel rim measured by the sensor III 100, the offset size of the wheel can be calculated.

After completing the measuring of the position degree, the lower servo electric cylinder I 33 lowers the lower top plate 51 to be separated from the wheel flange surface through the lower guiding posts I 2 and the lower guiding sleeves I 4; the lower servo electric cylinder II 58 moves the lower top plate 51 to the right through the lower guiding rail II 44; the lower servo electric cylinder III 61 is moved downward through the lower guiding posts II 36, the lower guiding sleeves II 35 and the guiding key 37, so that the upper end face of the lower top plate 51 is placed below the upper end face of the end positioning shaft 13; the lower servo electric cylinder I 33 lifts the end positioning shaft 13 through the lower guiding posts I 2 and the lower guiding sleeves I 4, so that the upper end face thereof is level with the wheel flange surface; meanwhile, the probe of the dial indicator I 14 is in contact with the wheel flange surface; and the lower servo motor I 3 rotates the central shaft 10 and the dial indicator I 14 through the pulley I 7, the pulley II 9 and the synchronous belt 8, and the runout of the wheel flange surface can be measured at this time.

What is claimed is:

1. A wheel comprehensive detecting device, comprises a frame, lower guiding posts I, a lower servo motor I, lower guiding sleeves I, a lower fixing plate I, a lower lifting plate, a pulley I, a synchronous belt, a pulley II, a central shaft, a central bearing pedestal, a spring I, an end positioning shaft, a dial indicator I, a jackscrew, a fixing block, a sliding post, a lower cone shaft, an upper cone shaft, a cross hinge, an upper shaft I, an upper bearing pedestal I, an upper lifting plate, upper guiding posts, upper guiding sleeves, upper cylinders, a vertical plate, a lower servo motor II, a lower sliding plate I, a lower gear I, a lower rack I, a lower guiding rail I, lower servo electric cylinders I, a lower fixing plate II, lower guiding sleeves II, lower guiding posts II, a guiding key, a lifting sleeve, a lower gear II, a lower ring gear, a ring guiding rail, a lower plate I, a lower plate II, a lower guiding rail II, a lower plate III, a sensor I, a lower sliding plate II, a spring II, a lower guiding rail III, a lower plate IV, a lower top plate, a measuring sleeve, a measuring post, a lower rack III, a lower gear III, a lower servo motor III, a lower plate V, a lower servo electric cylinder II, a lower plate VI, a lower servo motor IV, lower servo electric cylinders III, a lower servo motor V, a lower sliding plate III, a lower guiding rail IV, a lower gear IV, a lower rack IV, a lower servo motor VI, a lower transversal plate I, a lower gear V, a lower rack V, a lower guiding rail V, a lower transversal plate II, a lower servo motor VII, a lower plate VII, a lower bearing pedestal I, a lower shaft I, a lower overturning frame, a lower servo motor VIII, a lower overturning plate, a dial indicator II, a sensor II, an upper servo motor I, an upper sliding plate, an upper guiding rail I, an upper gear I, an upper rack I, an upper gear II, an upper rack II, an upper transversal plate I, an upper servo motor II, an upper guiding rail II, an upper transversal plate II, an upper servo motor III, an upper shaft II, an upper bearing pedestal II, an upper overturning frame, an upper servo motor IV, an upper overturning plate, a dial indicator III and a sensor III, characterized in that the lower lifting and rotating system comprises: the four lower guiding sleeves I are fixed on the lower fixing plate I; the four lower guiding posts I matching with the four lower guiding sleeves I are fixed below the lower lifting plate; the two lower servo electric cylinders I are fixed below the fixing plate I, and the output end thereof is hinged to the lower part of the lower lifting plate; the lower servo motor I is fixed below the lower fixing plate I through a transition flange, and the output end thereof is fixed with the pulley I; the central bearing pedestal is fixed above the lower lifting plate; the central shaft is mounted inside the central bearing pedestal through a bearing; the pulley II is fixed below the central shaft; and the pulley I and the pulley II are connected by the synchronous belt, the measuring system I comprises: the end positioning shaft is mounted in a hole at the upper end of the central shaft through a bearing; the outer circumference of the sliding post is slidably matched with the inner hole of the end positioning shaft; the jackscrew is mounted on the end positioning shaft, and the top end thereof is engaged with the opening groove on the sliding post; the lower cone shaft is fixed on the top end of the sliding post; the spring I is mounted in the inner hole of the end positioning shaft and is placed on the lower end of the sliding post; the fixing block is fixed on left side above the central shaft; and the dial indicator I is fixed on the fixing block, and the probe thereof is mounted upward, the measuring system II comprises: the lower fixing plate II is fixed on the outer side of the central shaft; the four lower guiding sleeves II fixed on the lower fixing plate II; the four lower guiding posts II matching with the four lower guiding sleeves II are fixed below the lifting sleeve; the two lower servo electric cylinders III are fixed below the lower fixing plate II, and the output end thereof is hinged to the lower part of the lifting sleeve; the guiding key of the lifting sleeve is mounted on the outer side of the top end of the central shaft; the lower ring gear is fixed on the outside above the lifting sleeve; the ring guiding rail is also fixed on the outer side above the lifting sleeve, and is placed above the lower ring gear; the lower plate I is fixed on the slider of the ring guiding rail; the lower plate II is fixed above the lower plate I; the lower plate VI is fixed on the lower end of the right side of the lower plate I; the lower plate V is fixed on the upper end of right side of the lower plate VI; the lower servo motor IV is fixed above the lower plate VI, and the output end thereof is fixed with the lower gear II; the lower gear II is meshed with the lower ring gear; the lower plate III is mounted above the lower plate II through the lower guiding rail II; the lower servo electric cylinder II is fixed on the lower plate V, and the output end thereof is connected to the lower part of the lower plate III; the lower top plate is fixed above the lower plate III through the lower plate IV; the lower sliding plate II is mounted below the lower top plate through the lower guiding rail III; the measuring sleeve is fixed above the lower sliding plate II; the measuring post is matched with the measuring sleeve, and the top end thereof protrudes from the upper end surface of the lower top plate; the spring II is mounted inside the measuring sleeve, and is placed below the measuring post; the sensor I is fixed on the lower sliding plate II, and the top end thereof is in contact with the lower end surface of the measuring post; the lower servo motor III is fixed below the lower top plate through a lower flange, and the output end thereof is fixed with the lower gear III; the lower rack III is fixed on the right side of the lower sliding plate II; and the lower gear III is meshed with the lower rack III, the number of the sets of the measuring system II of the device corresponds to the number of wheel bolt holes, the upper pressing system comprises: the four upper guiding sleeves are fixed on the top end of the frame; the four upper guiding posts matching with the four upper guiding sleeves are fixed above the upper lifting plate; the two upper cylinders are also fixed on the top end of the frame, and the output end thereof is hinged to the upper part of the upper lifting plate; the upper bearing pedestal I is fixed below the upper lifting plate; the upper shaft I is mounted inside the upper bearing pedestal I through a bearing; and the lower end of the upper shaft I is fixed with the upper cone shaft through the cross hinge, the translation system comprises: the lower sliding plate I is mounted on the right side above the lower lifting plate through the lower guiding rail I; the lower rack I is fixed above the lower lifting plate; the lower servo motor II is fixed above the lower sliding plate I, and the output end thereof is fixed with the lower gear I; the lower gear I is meshed with the lower rack I; and the vertical plate is fixed above the lower sliding plate I, the measuring system III comprises: the lower sliding plate III is mounted on the left side of the vertical plate through the lower guiding rail IV; the lower rack IV is fixed on the left side of the vertical plate; the lower servo motor V is fixed on the left side of the lower sliding plate III, and the output end thereof is fixed with the lower gear IV; the lower gear IV is meshed with the lower rack IV; the lower transversal plate I is fixed above the lower sliding plate III; the lower servo motor VI is fixed below the lower transversal plate I, and the output end thereof is fixed with the lower rack V; the lower transversal plate II is mounted above the lower transversal plate I through the lower guiding rail V; the lower rack V is fixed on the right side of the lower transversal plate II; the lower rack V is meshed with the lower gear V; the lower plate VII is fixed on the left side above the lower transversal plate II; the lower bearing pedestal I is fixed on the left side of the lower plate VII; the lower shaft I is mounted inside the lower bearing pedestal I through a bearing; the lower servo motor VII is fixed on the right side of the lower plate VII, and the output end thereof is connected with the right side of the lower shaft I; the lower overturning frame is fixed on the left side of the lower shaft I; the lower servo motor VIII is fixed above the lower overturning frame; the right side of the lower overturning plate is connected with the output end of the lower servo motor VIII; the dial indicator II is fixed on the left side of the lower overturning plate, and the probe thereof is mounted upward; and the sensor II is fixed below the lower overturning frame, and the probe thereof is mounted downward, the measuring system IV comprises: the upper sliding plate is mounted on the left side of the vertical plate through the upper guiding rail I; the upper rack I is fixed to the left side of the vertical plate; the upper servo motor I is fixed to the left side of the upper sliding plate, and the output end thereof The upper gear I is fixed; the upper gear I is meshed with the upper rack I; the upper transversal plate I is fixed at the lower end of the upper sliding plate; the upper servo motor II is fixed on the lower end of the upper transversal plate I, and the output end thereof is fixed with the upper gear II; the transversal plate II is mounted above the upper transversal plate I through the upper guiding rail II; the upper rack II is fixed on the right side of the upper transversal plate II; the upper rack II is meshed with the upper gear II; the upper bearing pedestal II is fixed on the left side of the upper end of the upper transversal plate II; the upper shaft II is mounted inside the upper bearing pedestal II through a bearing; the upper servo motor III is fixed on the right side of the upper end of the upper transversal plate II, and the output end thereof is connected with the right end of the upper shaft II; the upper overturning frame is fixed on the left side of the upper shaft II; the upper servo motor IV is fixed below the upper overturning frame; the output end of the upper servo motor IV is connected with the right side of the upper overturning plate; the dial indicator III is fixed on the left side of the upper overturning plate, and the probe thereof is mounted downward; and the sensor III is fixed above the upper overturning frame, and the probe thereof is mounted upward.

\* \* \* \* \*